United States Patent [19]

Rinehart

[11] Patent Number: 5,005,310
[45] Date of Patent: Apr. 9, 1991

[54] FLOATING TIP-UP FISHING RIG

[75] Inventor: John R. Rinehart, Milton, Wis.

[73] Assignee: American Institute of Taxidermy, Inc., Janesville, Wis.

[21] Appl. No.: 517,024

[22] Filed: May 1, 1990

[51] Int. Cl.⁵ ............................................. A01K 97/12
[52] U.S. Cl. ........................................ 43/17; 43/44.9; 43/44.88
[58] Field of Search .................. 43/4, 17, 43.13, 26.1, 43/44.88, 44.9, 44.91

[56] References Cited

U.S. PATENT DOCUMENTS

| | | | |
|---|---|---|---|
| 2,572,340 | 10/1951 | Hockenbull | 43/44.9 |
| 3,003,277 | 10/1961 | Vann | 43/43.13 |
| 3,099,099 | 7/1963 | Cahen | 43/17 |
| 3,407,528 | 10/1968 | Lenning | 43/17 |
| 3,641,693 | 2/1972 | Pinnow | 43/17 |
| 3,973,347 | 8/1976 | Kearney | 43/17 |
| 4,199,889 | 4/1980 | Van Orden | 43/44.88 |
| 4,763,437 | 8/1988 | Cuda | 43/17 |
| 4,809,456 | 3/1989 | Caparelli | 43/17 |

Primary Examiner—Kurt Rowan
Attorney, Agent, or Firm—Howard M. Herriot

[57] ABSTRACT

A floating tip-up fishing rig is provided having a float body, a flagpole, and spring means mounted atop said body at one end thereof and connected to the bottom portion of the flagpole urging it to an upright position. A tube is disposed vertically through the float body substantially centrally thereof, and extends below and above the body. The tube has a reduced wall or groove portion immediately below the body and above the bottom of the tube, and a fishline is coiled about the tube in that groove portion. Extending down from the central portion of the flagpole is a string, the bottom end of which is connected to the eye end of a cotter pin. The cotter pin has a flared open end opposite the eye end and an elongated closed portion in between those ends. The string and cotter pin extend down into the tube when the flagpole is in a horizontal or slightly raised position. The tube has a J-slot in its top end into which the flagpole is placed for holding it in horizontal position. The tube has a vertical slit extending up from its bottom to near the groove portion of the tube, and the fishline may be pulled from its coiled up portion through slit into the tube and set in the closed portion of the cotter pin. The slit is flared at its bottom to enhance that setting operation, and the flared open end of the cotter pin further enhances it. The tube, across from the slit, is shorter than at the slit to thereby provide a recess opening for easy finger access to the tube for the setting operation. The flagpole at its free end is bent to form a lift hook.

12 Claims, 6 Drawing Sheets

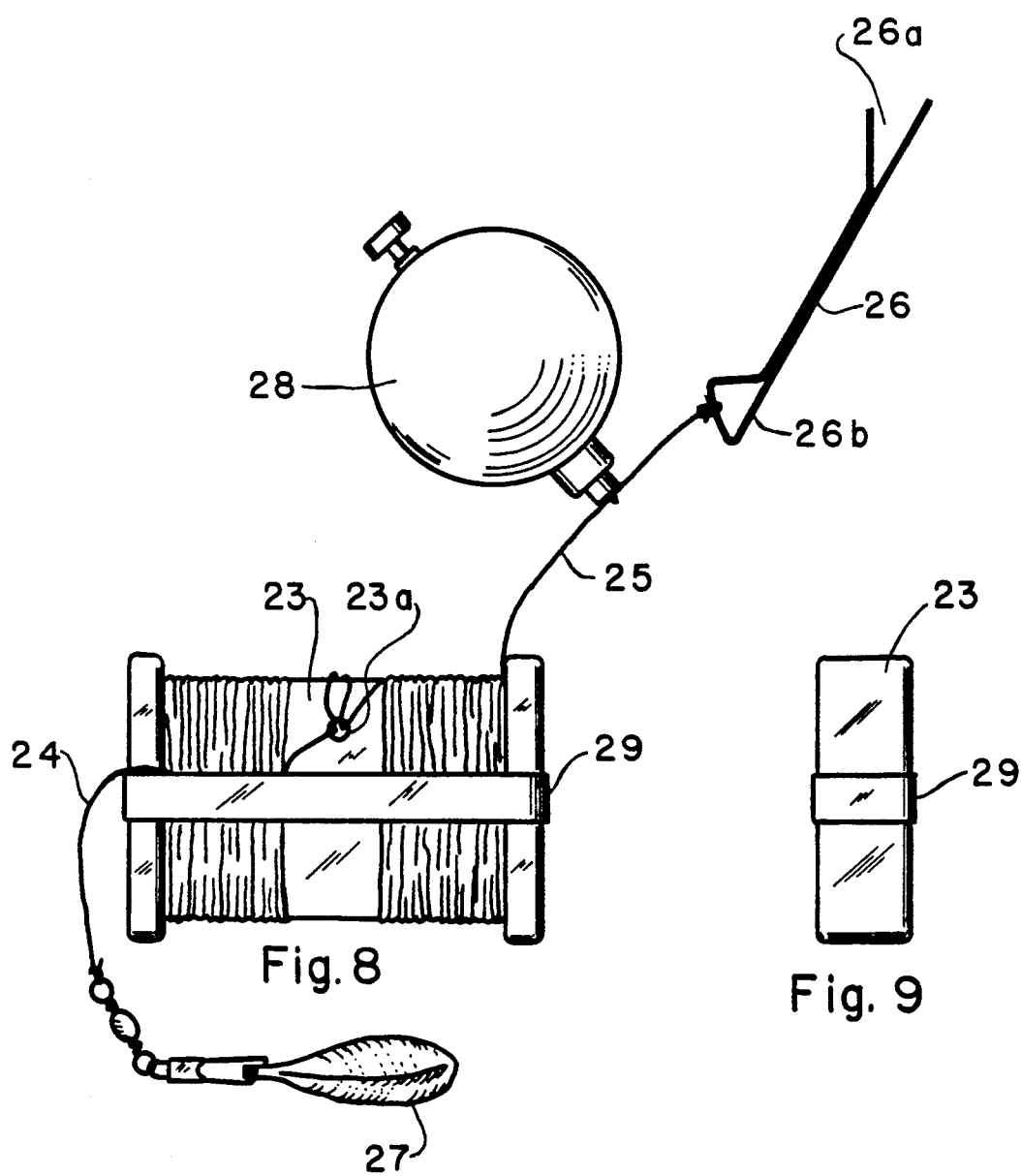
Fig. 8
Fig. 9
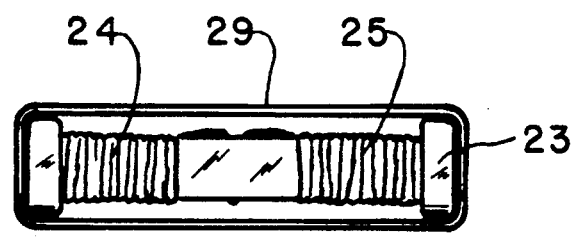
Fig. 10

FLOATING TIP-UP FISHING RIG

BACKGROUND OF THE INVENTION

Tip-up fishing rigs are known for fishing through a hole in the ice on a lake or river. Such rigs are mounted on or rest on the ice near the hole, and have a flagpole latched in a "down" position, but unlatched to an "up" position upon a fish taking the baited fishhook and running with it. Such rigs are not suited for use in open water, but are suited only for use on ice near a hole therethrough, because they either do not float, or do not float in an operable fashion.

SUMMARY OF THE INVENTION

This invention provides a floating tip-up fishing rig for use in open water, which is easy to use, effective, and inexpensive to manufacture.

A boat-shaped float body has a tube extending vertically therethrough and has a flagpole atop the body urged toward upright position by a spring. The flagpole may be latched in a horizontal position so as to be held there while the fisherman baits the fishhook, lets out, from the fishline coiled about the tube just under the float body, the desired amount of fishline, and sets the fishline in a friction grip device such as a cotter pin. The cotter pin is connected by a string to a central portion of the flagpole, with the string and cotter pin extending down into the tube. After baiting, letting-out line, and setting the line in the pin, the flagpole is unlatched whereupon it moves, under the urging of the spring, to a slanted position in between the horizontal position and the upright position. When a fish takes the bait, the fishline is pulled from the pin, and the flagpole is moved to the upright position by the spring.

BRIEF DESCRIPTION OF THE DRAWINGS

FIG. 8 is a top view of the anchor - and - buoy device shown in FIG. 7;

FIG. 9 is an end view of the buoy portion of that device;

FIG. 10 is a side view thereof;

DETAILED DESCRIPTION

Figure 1:
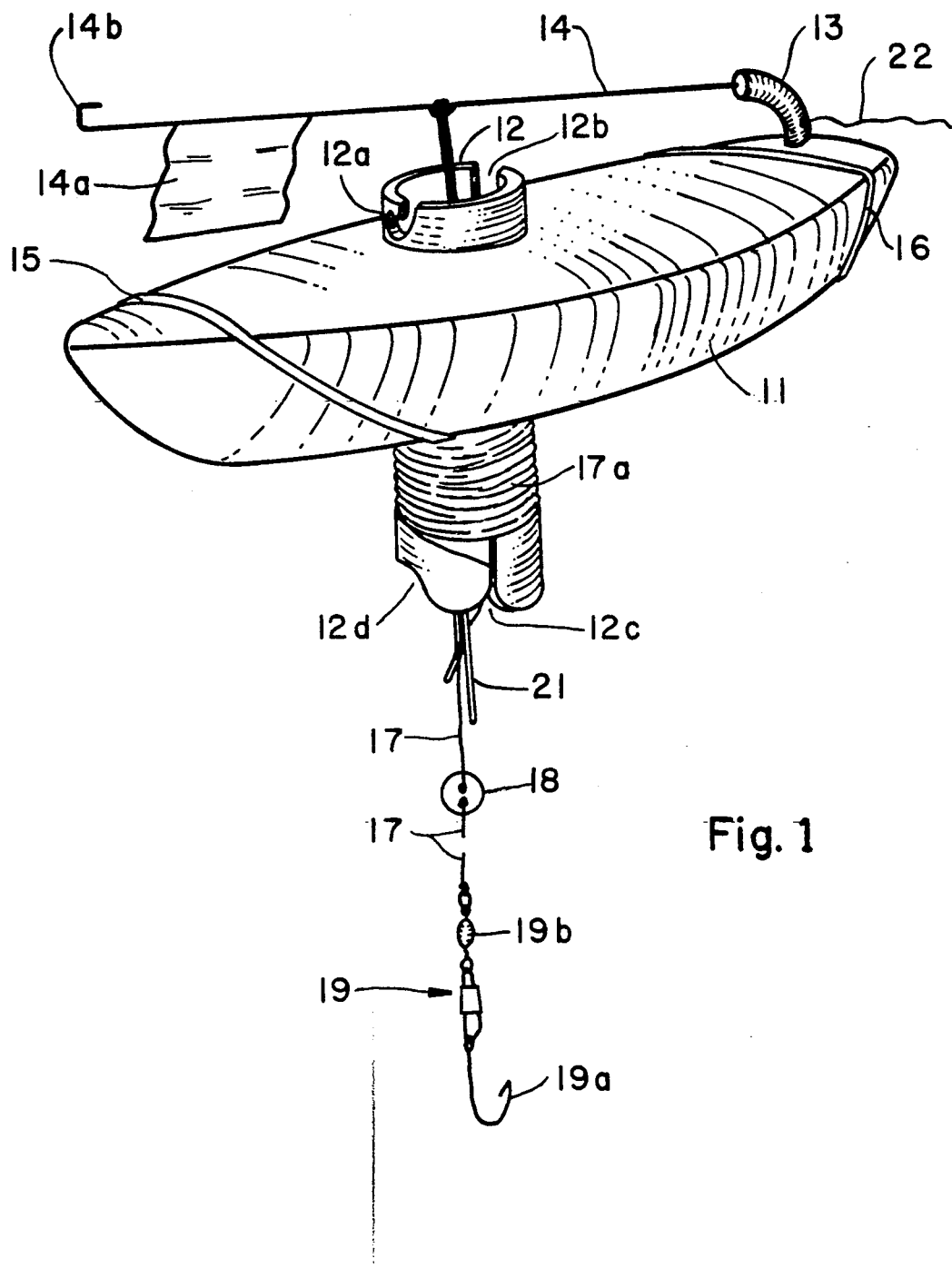
FIG. 1 is an isometric view of the floating tip-up fishing rig of this invention.

Referring to the drawing, there is shown a floating tip-up fishing rig of my invention having a float block or body 11 with a vertical opening or well therethrough in which a tube 12 is mounted. The tube 12 is located centrally of body 11 extending vertically therethrough and projecting upwardly from the top deck thereof and downwardly from the bottom thereof. A coil spring 13 is mounted on the top deck near the rear of the body 11, and a flag pole 14 is attached to the upper end of the spring 13. The flagpole 14 has thereon near its free end a flag 14a, and has its free end bent into a lift hook 14b. An elastic band 15 is stretched about body 11 near the front end thereof as shown, and an elastic band 16 is stretched about the body 11 near the rear end thereof, as shown.

Figure 6:
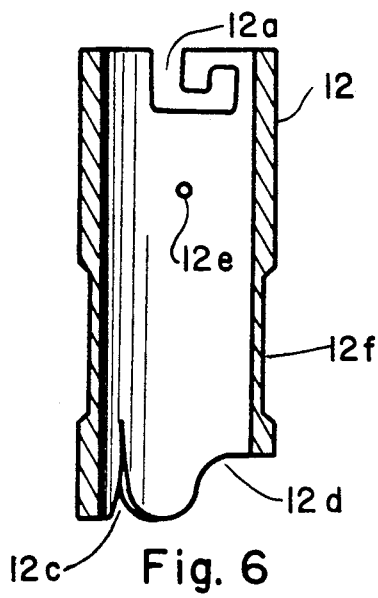
FIG. 6 is a sectional view taken on line 6—6 of FIG. 5.

A fishing line 17 has a quantity 17a of line wrapped or coiled around tube 12, as shown, being wrapped or coiled about a reduced spool portion 12f of the tube, which reduced portion 12f can be seen in FIG. 6. A sinker button 18 is disposed on line 17, as shown in FIGS. 1 and 3, and a tackle rig 19 including a fishhook 19a and a swivel connector 19b is connected to the end of the fish line as shown in FIGS. 1, 2 and 3.

Figure 2:
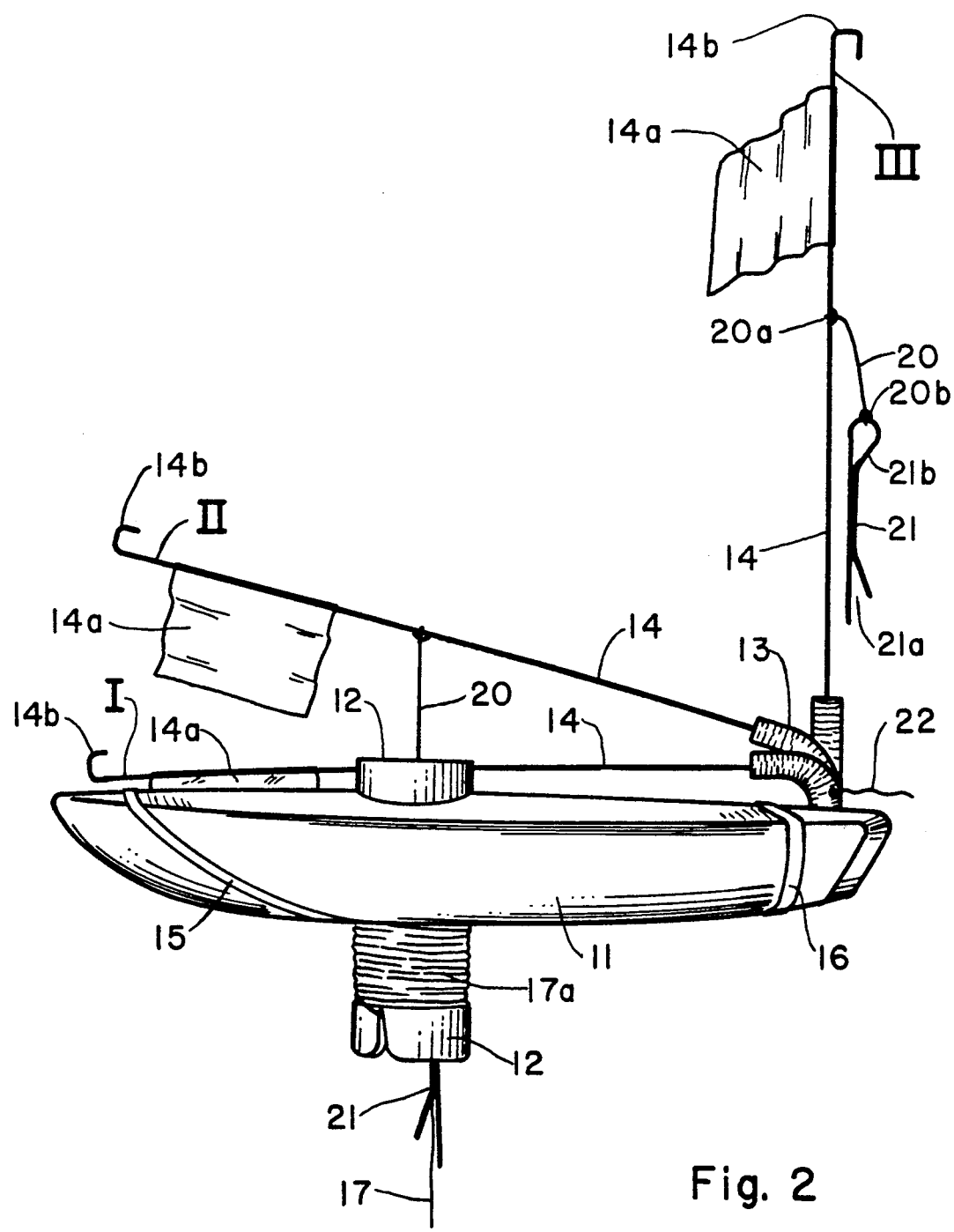
FIG. 2 is a left side elevation view thereof, showing its flagpole in each of three operating positions i.e. positions I, II and III.
Figure 3:
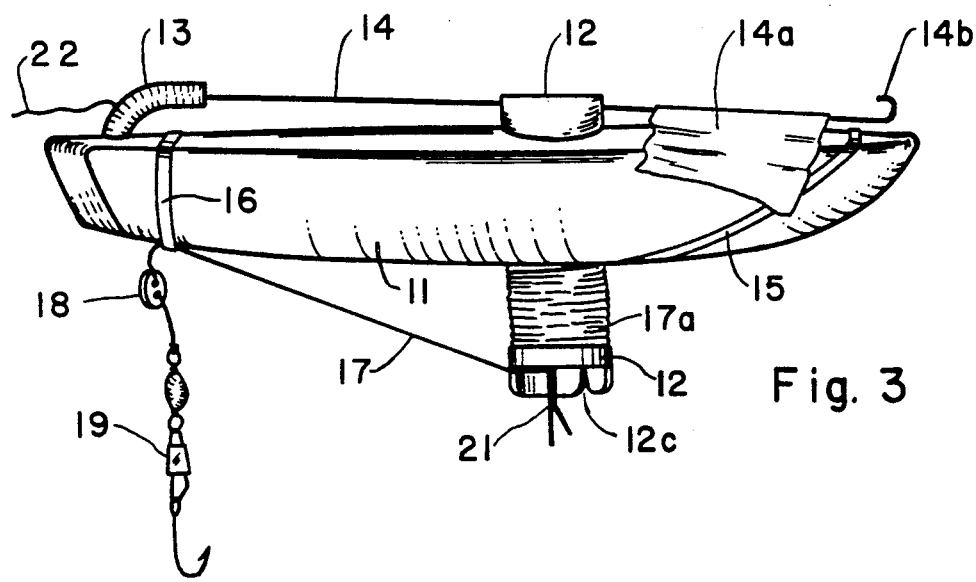
FIG. 3 is a right-side elevation view of the invention.

A cord, wire, chain or string 20 at its upper end 20a is tied to the flagpole 14 near the middle portion thereof as best seen in FIG. 2. The string 20, at its lower end 20b is tied to a cotter pin 21 at the eye end 21b thereof which is opposite the open flared end 21a of the cotter pin.

A tether line 22, of any desired length, is connected at one of its ends to the coil spring near the lower end of the spring.

Figure 5:
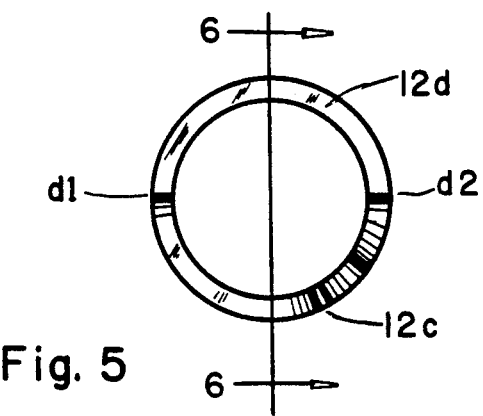
FIG. 5 is a bottom view of said tube portion.

Tube 12 has a J-shaped slot 12a in the top portion of the tube at the front of the tube, and has a U-shaped slot 12b in the top portion of the tube at the rear of the tube. At the bottom of the tube 12 there is a flared slit 12c which is very narrow at its top but flares to be wide open at its bottom. Slit 12c extends up to near the bottom of the coiled portion 17a of the fishline. Located approximately diametrically across the tube from flared slit 12c is a cut-out opening or recess 12d which extends about 180° around the tube. In other words, tube 12, on the side across from slit 12c, does not extend downwardly as far as the side in which slit 12c is disposed. This recess 12d extending from point dl to point d2, as shown in FIG. 5, provides finger access for setting the tip-up rig, as hereinafter explained. A tiny knot hole 12e through the front wall of tube 12 serves to permit one end of the fishing line 17 to enter the tube and to be anchored to the tube, with a knot on the end of the line disposed on the inside of the tube up against the tube at hole 12e. The rest of the line is outside the tube, most of it coiled about the reduced spool portion 12f of tube 12, and some of it extending from there to the tackle rig 19 at the hook end of the fishline.

Figure 4:
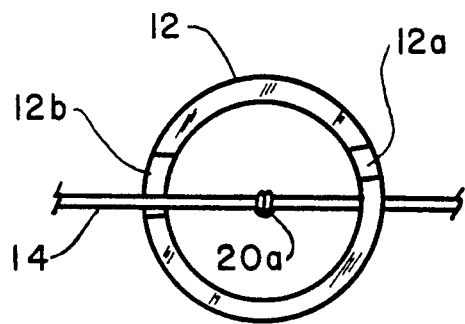
FIG. 4 is a top view of the tube portion and part of the flagpole.

In the operating position I, shown in FIG. 2, which is the baiting and setting position, the flagpole is locked down in a horizontal position, passing through U-shaped slot 12b, and held in the closed end of the J-shaped slot 12a in tube 12. This horizontal locked-down position of the flagpole is also shown in FIG. 3 and again in FIG. 4. In this locked-down position, the flagpole is held against flying up at the urging of spring 13, being held securely in the J-shaped slot 12a while the fisherman baits the fishhook, lets out a desired amount of the line 17 from the coiled up quantity 17a, and sets or fixes the line 17 in the cotter pin 21. He so sets the line by sliding it up into and above the open flared end 21a to a place between the closed together pin members in the central part of the cotter pin. To facilitate this task, the recess opening 12d in the tube 12 allows the fisherman's fingers easy access into the tube for grasping the cotter pin in one hand, while he is manipulating the fish line 17 with his other hand, pulling the line up into the flared end of slit 12c and through the narrow part of slit 12c, and across the interior of tube 12, making the line taught for more easily fixing or setting the line in the closed portion of the cotter pin. To set the line 17 lightly therein, the line is placed down near the open flared end 21a; to set the line tightly therein, the line is placed therein up near the eye end 21b; and to fix the line at a medium or moderate resistance setting, the line is set in the pin more centrally or medially, e.g. half-way between open flared end 21a and eye end 21b.

Figure 7:
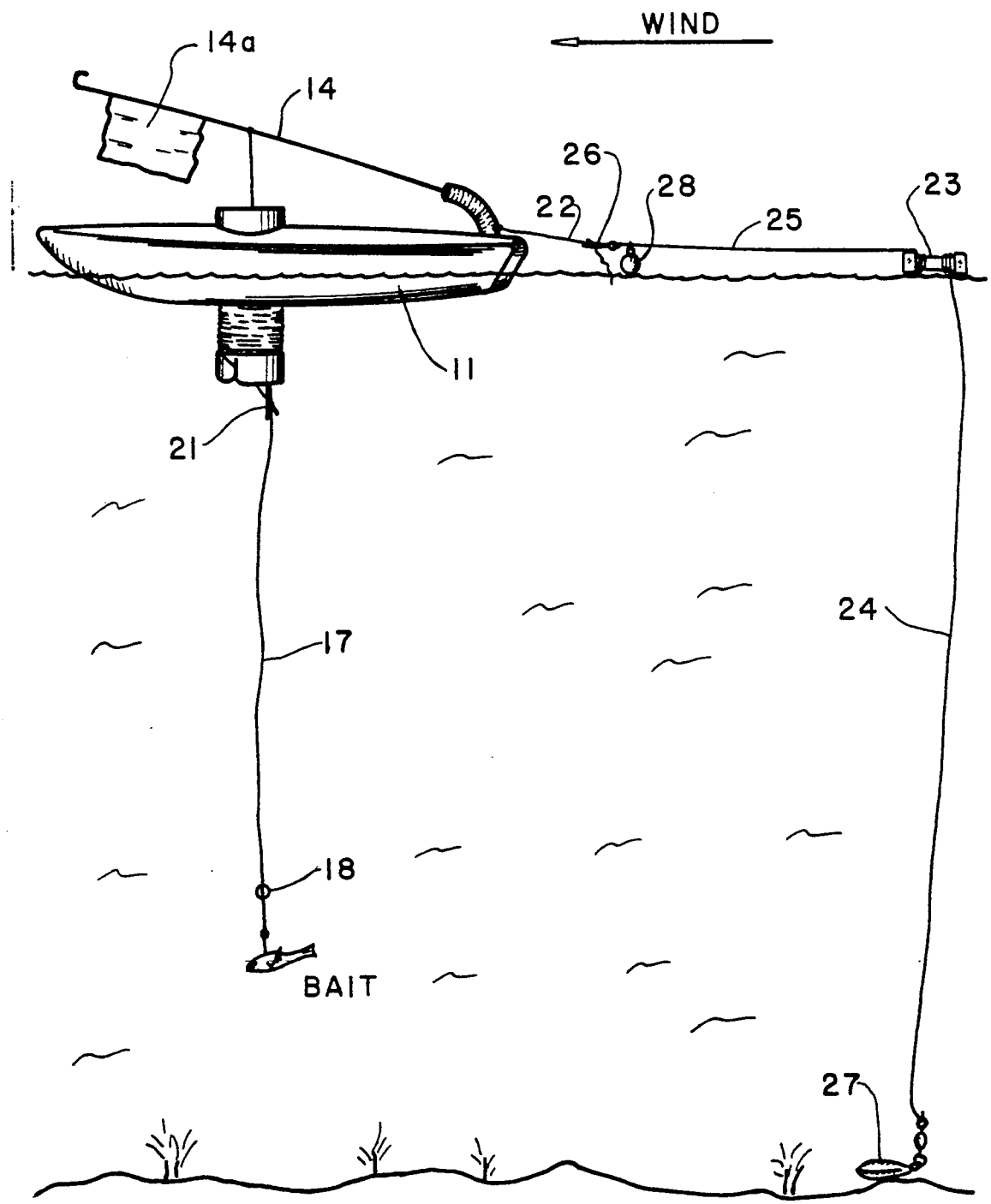
FIG. 7 is a side view schematic showing of the rig, in the water, tethered with an anchor - and - buoy device.

After the fishhook is baited with the desired bait and after setting the line in the cotter pin to the desired resistance (selected to suit the size and weight of bait used for attracting the type of fish desired), the flagpole is then lifted out of the J-shaped slot 12a and released, whereupon, under the urging of spring 13, the flagpole moves up to and rests at the position II shown in FIG. 2. The fishline extends from coil 17a through slit 12c up into tube 12 to the cotter pin. Position II is the fishing position, wherein the spring 13 is urging the flagpole upwardly toward position III, but the flagpole is held in position II because it is connected to tube 12, via string 20, cotter pin 21, fishline 17 and slit 12c, so as to be held in position II. The baited fishhook is connected to the cotter pin via the fishline portion running out beyond the cotter pin and into the water to tackle rig 19 carrying the baited fishhook. In this way the rig is set for fishing. A fisherman, on shore or in a boat, may let the body 11 float out away from the shore or the boat on a long tether line 22; or if desired, the body 11 may be tethered to an anchored buoy as shown in FIG. 7, via a short tether line 22, a grip 26, a grip line 25, buoy 23, anchor line 24 and anchor 27.

When a large enough fish takes the bait and runs with it, the fishline becomes taught and is pulled out of and away from the cotter pin. When the line is thus pulled out of the cotter pin, the flagpole is disconnected from the tube 12 and is moved up to position III by the spring 13. The fish may then run further with the bait, taking more line out off the coiled line 17a on tube 12.

The fisherman, who may be holding a long tether line from in a boat or on shore, sees that the flag has gone up ("tipped-up"), and thus knows that a fish has struck. He then may pull the float 11 close to him (using tether line 22) to gain access to the float 11 and the fishline 17. If the boat or the shore is high enough above the water so that the float may not be easily reached, the fisherman may use a long stick or rod to reach down and out and lift the float from the water to himself with the stick or rod extended into the lift hook 14b at the end of flagpole. The fisherman then pulls in any slack in the fishline until he feels the resistance of the fish. He then sets the hook and pulls the line in, together with the hooked fish.

The anchorable tethering means shown in FIGS. 7-10 comprises: a floating spool buoy 23 having connected thereto an anchor line 24 and a tether grip line 25; a tether grip 26; an anchor 27; a ball float 28; and a rubber band 29. The buoy 23 has therethrough a hole 23a, as shown, through which lines 24 and 25 pass for tying those lines to the buoy. One end of line 24 is thus connected to the buoy, and the other end of line 24 is connected to anchor 27, which may be a metal sinker. An intermediate portion of line 24 is wrapped about a first end of spool buoy 23. One end of line 25 is likewise connected to the buoy and its other end is connected to the tether grip 26, with an intermediate portion of line 25 wrapped about a second end of spool buoy 23. Tether grip 26 is a friction grip device such as a cotter pin having a flared open end 26a and a closed loop eye end 26b, with a friction gripping portion intermediate those ends. A ball float 28 of the fishing bobber type, with a spring biased hook shaft, may be releasably connected to either the eye end 26a or to the line 25 near said eye end.

The anchorable tethering means just described may be used to position the fishing rig on the water, over desired fishing grounds, merely by: connecting tether line 22 to the cotter pin grip 26; letting out from spool buoy 23 the desired amount of tether grip line 25; letting out from spool buoy 23 the desired amount of anchor line 26; and placing rubber band 29 about the spool buoy to hold the lines at those desired let-outs. The fisherman may then position himself away from the fishing rig in a boat or on shore, remote from and unconnected to the rig, and the rig will stay in its position tethered to the anchored buoy, as shown in FIG. 7.

When a fish takes the bait, and runs all of the fishline out, it is then possible that the tether line 22 may be pulled out of the tether grip 26, depending upon the frictional force of the grip; and if that happens, the grip 26 would sink but for being held afloat by ball float 28. The fisherman accordingly does not need to get his arm or shirtsleeve wet when he retrieves clip 26 either to again connect it to tether line 22 or to gather in the anchorable tethering means and store it away when done fishing.

Figure 11:
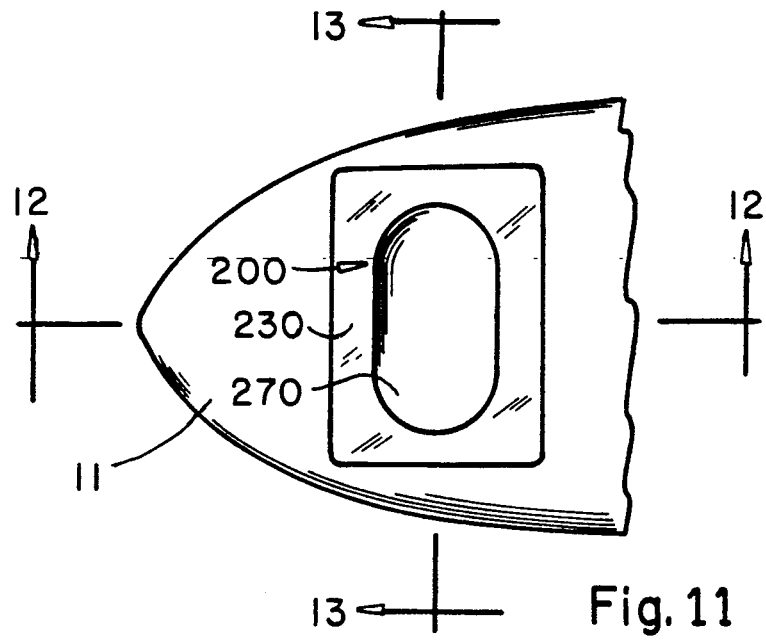
FIG. 11 is a top view of a front portion of the float body of the rig, showing a storage cavity in that body for storing the anchor - and - buoy device.
Figure 12:
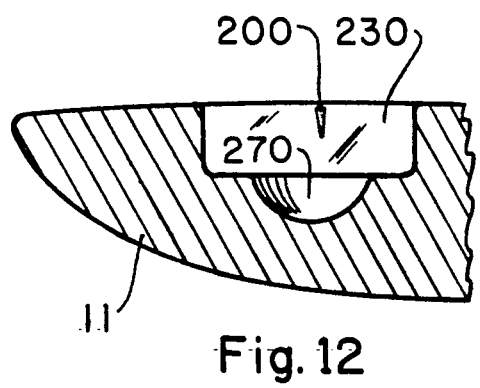
FIG. 12 is a sectional view, taken on line 12—12 of FIG. 11.
Figure 13:
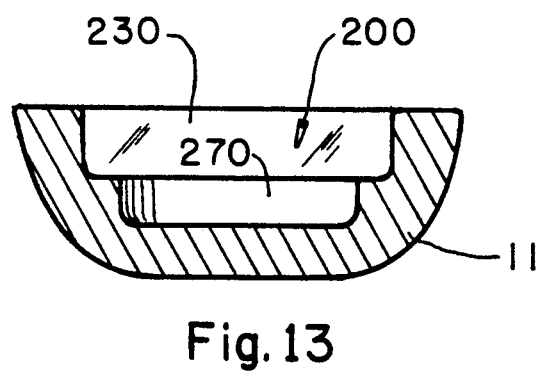
FIG. 13 is a section view, taken on line 13—13 of FIG. 12.

The anchorable tethering means may be easily and conveniently stored, using storage cavity 200 in float body 11. FIGS. 11, 12 and 13 show cavity 200 as comprising a lower cavity 270 and an upper cavity 230. The lower cavity is shaped and sized to receive the sinker anchor 27 portion of the anchorable tethering means, and the upper cavity 230 is shaped and sized to receive the float spool 23 portion (with its wound lines 24, 25, its cotter pin grip 26, and its rubber band 29). The ball float or bobber 28 may be left connected so as to ride on the top deck of float body 11, or may be disconnected and stored in the fisherman's tackle box or elsewhere.

When the tip-up rig is not is use, e.g. when being stored or transported, the elastic bands 15 and 16 may be used for ensuring compactness and neatness of the rig. Rubber band 15 may be used in a manner not shown, but easily understood, to hold the flagpole 14 firmly against the top deck of float 11 near the front end thereof, thus preventing spring 13 from causing flagpole 14 to fly up if the flagpole should get knocked out of J-slot 12a. Rubber band 15 may be used to hold the fishline firmly against the bottom of float 11, near the rear thereof, as shown in FIG. 3, preventing the fishline 17 and tackle rig 19 from entanglement with anything.

What is claimed is:

1. A floating tip-up fishing rig comprising:
    a float body;
    a flagpole;
    spring means mounted atop said body near one end thereof and connected to the bottom portion of said flagpole, urging it to an upright position;
    a tube disposed vertically through said float body centrally thereof, and extending below the body;
    a fishline having its inner end connected to said tube and having a portion coiled about the tube above the bottom thereof and immediately below said body;

a cotter pin having an eye end, on open flared end, and an elongated closed portion between said ends;

string means extending from a central portion of said flagpole down into said tube, connecting said flagpole to the eye end of said cotter pin;

said tube having a vertical slit therein extending upwardly from its lower end up to near the bottom of the coiled portion of the fishline;

whereby said fishline may be pulled through said slit from the coiled portion of the fishline to extend into said tube and be set in to the closed portion of said cotter pin.

2. The invention of claim 1 wherein:

the side of said tube across from said slit extends downward from said body a lesser distance than does the side in which said slit is disposed, thereby providing a recess for easy finger access into the tube.

3. The invention of claim 1, wherein:

said slit is flared out at its bottom to be wider there than at its top.

4. The invention of claim 1, wherein:

said flagpole at its free end is bent to form a lift hook.

5. The invention of claim 1, wherein:

said tube extends above said body and has a J-slot in the top of the tube at its side furthest from the bottom portion of said flagpole, whereby said flagpole may be held in said J-slot in a horizontal position.

6. The invention of claim 1 wherein:

said tube has a reduced wall portion forming a groove in its exterior just below said body for receiving said coiled fishline.

7. The invention of claim 1 wherein:

the side of said tube across from said slit extends downward from said body a lesser distance than does the side in which said slit is disposed, thereby providing a recess for easy finger access into the tube;

said slit is flared out at its bottom to be wider there than at its top.

said flagpole at its fee end is bent to form a lift hook;

said tube extends above said body and has a J-slot in the top of the tube at its side furthest from the bottom portion of said flagpole, whereby said flagpole may be held in said J-slot in a horizontal position; and said tube has a reduced wall portion forming a groove in its exterior just below said body for receiving said coiled fishline.

8. A floating tip-up fishing rig comprising:

a float body;

a flagpole;

spring means mounted atop said body near one end thereof and connected to the bottom portion of said flagpole, urging it to an upright position;

said float body having an opening extending vertically therethrough;

said float body having a fishline storage cylinder extending below said body;

a fishline having its inner end connected to said cylinder and having its main portion coiled thereabout;

fishing grip means for releasably gripping said fishline;

string means extending from a central portion of said flagpole down into said opening, connecting said flagpole to said grip means;

whereby said fishline may be pulled from the main coiled portion of the fishline and be releasably set in said grip means.

9. The invention of claim 8 further having a tether line connected to said float body at one end thereof.

10. The invention of claim 9, further having an anchorable tethering means comprising:

a floating buoy spool;

a releasably gripping tether line clip;

a sinking anchor;

an anchor line at one end connected to the central portion of said buoy spool and at its other end connected to said anchor, with an intermediate portion of said anchor line being wrapped about said spool at a first end thereof; and a tether clip line at one end connected to the central portion of said buoy spool and at its other end connected to said clip, with an intermediate portion of said tether clip line being wrapped about said spool at a second end thereof;

whereby said clip may be releasably gripped to the tether line of said float body, to thereby fix the position of said float body on the water tethered to said floating buoy spool, with said spool being anchored to the bottom via said anchor line and said anchor.

11. The invention of claim 10 wherein said float body has in its upper surface a cavity for storing said anchorable tethering means when said means is not in use.

12. The invention of claim 11 wherein said cavity has a lower portion shaped and sized to receive said anchor and an upper portion shaped and sized to receive said spool.

* * * * *